United States Patent
Tao et al.

(10) Patent No.: US 11,095,004 B2
(45) Date of Patent: Aug. 17, 2021

(54) CLAMPING SYSTEM AND METHOD FOR LASER WELDING BATTERY FOILS TO A BATTERY TAB

(71) Applicant: GM Global Technology Operations LLC, Detroit, MI (US)

(72) Inventors: Wu Tao, Hubei Providence (CN); Li Sun, Shanghai (CN); Xiaochao Que, Shanghai (CN); Haijing Liu, Shanghai (CN); Teresa J. Rinker, Royal Oak, MI (US); Jeffrey A. Abell, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 531 days.

(21) Appl. No.: 15/943,065

(22) Filed: Apr. 2, 2018

(65) Prior Publication Data
US 2019/0305285 A1   Oct. 3, 2019

(51) Int. Cl.
*H01M 50/531* (2021.01)
*B23K 26/00* (2014.01)
(Continued)

(52) U.S. Cl.
CPC ....... *H01M 50/531* (2021.01); *B23K 26/0093* (2013.01); *B23K 26/22* (2013.01); *B23K 26/32* (2013.01); *H01M 10/0525* (2013.01)

(58) Field of Classification Search
CPC ...... H01M 2/26; H01M 2/0275; H01M 2/021; H01M 2/30; H01M 2/0212; H01M 2/266; H01M 2/0267; H01M 2/0287; H01M 2/08; H01M 2/1223; H01M 2/145; H01M 2/1653; H01M 2/204; H01M 2/206; H01M 2/263; H01M 2/02; H01M 2/0207; H01M 2/0215; H01M 2/06; H01M 2/1016; H01M 2/1077; H01M 2/1094; H01M 2/1229; H01M 2/1258; H01M 2/127; H01M 2/1606; H01M 2/166; H01M 2/1673; H01M 2/168; H01M 2/1686; H01M 2/18; H01M 2/22;
(Continued)

(56) References Cited

U.S. PATENT DOCUMENTS

| 4,623,777 A * | 11/1986 | Aihara ................ B23K 26/04 |
| | | 219/121.6 |
| 2002/0142211 A1* | 10/2002 | Nakanishi ......... H01M 10/0587 |
| | | 429/94 |

(Continued)

FOREIGN PATENT DOCUMENTS

| CN | 101499541 A | 8/2009 |
| CN | 201543931 U | 8/2010 |

(Continued)

*Primary Examiner* — Ibrahime A Abraham
*Assistant Examiner* — Chris Q Liu
(74) *Attorney, Agent, or Firm* — Quinn IP Law (57) ABSTRACT

A method for laser welding a plurality of battery foils to a battery tab that does not include ultrasonic welding and includes clamping the plurality of battery foils and the battery tab together. Each of the plurality of battery foils has a thickness that is between 0.004 millimeters and 0.03 millimeters. The battery tab has a thickness that is between 0.1 millimeters and 0.5 millimeters. The method further includes laser welding the plurality of battery foils to the battery tab.

16 Claims, 5 Drawing Sheets

(51) Int. Cl.
*B23K 26/22* (2006.01)
*B23K 26/32* (2014.01)
*H01M 10/0525* (2010.01)

(58) Field of Classification Search
CPC .......... H01M 2/305; H01M 2/34; H01M 2/36;
H01M 2/365; B23K 26/22; B23K 26/32;
B23K 26/0093; B23K 26/04; B23K
26/244; B23K 26/26; B23K 37/0435;
B23K 37/0408
USPC .............. 219/121.13, 121.14, 121.6, 121.63,
219/121.82, 72
See application file for complete search history.

(56) References Cited

U.S. PATENT DOCUMENTS

| | | | |
|---|---|---|---|
| 2013/0029206 A1* | 1/2013 | Lev | B23K 15/0006 |
| | | | 429/161 |
| 2015/0214553 A1* | 7/2015 | Yoo | H01M 2/26 |
| | | | 429/163 |
| 2016/0260952 A1* | 9/2016 | Park | H01M 50/543 |

FOREIGN PATENT DOCUMENTS

| | | |
|---|---|---|
| CN | 204544967 U | 8/2015 |
| CN | 205911377 U | 1/2017 |
| CN | 206824853 U | 1/2018 |
| CN | 107717225 A | 2/2018 |
| JP | H05190603 A | 7/1993 |

\* cited by examiner

CLAMPING SYSTEM AND METHOD FOR LASER WELDING BATTERY FOILS TO A BATTERY TAB

The present disclosure relates to a clamping system and method for laser welding battery foils to a battery tab of a lithium ion cell.

SUMMARY

During battery cell manufacturing, the battery foils are joined to a battery tab. In a battery, the battery tabs function as positive or negative electrodes. It is useful to join the battery tab to the battery foils to allow the energy of the battery cell to be transferred to an external source. To do so, the present disclosure describes a clamping system and a method for laser welding the battery foils to the battery tab. The battery foils are stacked together, and a clamping force is used to eliminate (or at least minimize the size of) the gaps between the battery foils. Elimination or at least minimization of the size of the gaps between the battery foils creates a structurally strong and efficient battery tab-to-foil weld without using ultrasonic welding. While ultrasonic welding may be used to join battery tabs to battery foils, ultrasonic welding suffers from some shortcomings, such as: weld quality inconsistency (e.g., non-uniform weld thickness and penetration), resonance, mechanical and thermal deformation (e.g., cracks), and adhesion to the tool. To avoid these shortcomings, it is desirable to create a tab-to-foil weld without using ultrasonic welding. By clamping the battery foils and the battery tab together, a structurally strong and efficient tab-to-foil weld are created using laser welding, but without using ultrasonic welding.

The presently disclosed method for laser welding a plurality of battery foils to a battery tab includes clamping the plurality of battery foils and the battery tab together. Each of the plurality of battery foils has a thickness that may be between 0.004 millimeters and 0.03 millimeters, and the battery tab has a thickness that may be between 0.1 millimeters and 0.5 millimeters. The method further includes laser welding the plurality of battery foils to the battery tab. However, the method does not include ultrasonic welding. To clamp the plurality of battery foils and the battery tab together, a first clamping arm and a second clamping arm are moved toward each other while the plurality of battery foils and the battery tab are disposed between the first clamping arm and the second clamping arm. The first clamping arm defines a first slot. The second clamping arm defines a second slot. The first slot and the second slot are aligned with each other to allow a laser beam to be received by the first slot and the second slot to join the plurality of battery foils to the battery tab during the laser welding. Each of the first slot and the second slot may have a thickness that is between one millimeter and three millimeters. The thickness of each of the plurality of battery foils may be 0.02 millimeters. The thickness of the battery tab may be 0.5 millimeters. The first clamping arm and the second clamping arm are part of a clamping system.

The clamping system may further include at least one lip coupled to the second clamping arm to align the battery tab with the plurality of battery foils to facilitate the laser welding. The method may further include placing the plurality of battery foils in tension before the plurality of battery foils and the battery tab are clamped together. The battery foils are placed in tension with a roller. The battery foils are coupled to the roller. The roller is rotated to place the plurality of battery foils in tension. The roller defines a groove sized to securely receive a securing portion of the plurality of battery foils in order to couple the plurality of battery foils to the roller. The method may further include cutting the plurality of battery foils to remove a disposable portion of the plurality of battery foils that is disposed around the roller after the laser welding. The disposable portion of the plurality of battery foils is cut with a cutter that may be directly coupled to the roller, wherein the cutter is retractable relative to the roller. The method may further include securing the plurality of battery foils with a stopper block after placing the plurality of battery foils in tension to maintain the plurality of battery foils in tension after the clamping. The disposable portion of the plurality of battery foils is cut with a cutter that may be directly coupled to the stopper block.

The first clamping arm and the second clamping arm are part of a clamping system, and the clamping system may further include an encoder assembly configured to detect a position of the first clamping arm relative to the second clamping arm. The encoder assembly is configured to move the first clamping arm relative to the second clamping arm in response to the detected position of the first clamping arm relative to the second clamping arm in order to align the first slot with the second slot. Each of the first slot and the second slot has a thickness that may be two millimeters. The thickness of each of the plurality of battery foils may be 0.02 millimeters. The thickness of the battery tab may be 0.5 millimeters.

The laser welding is conducted using a laser welding machine. The laser welding machine is configured to emit a laser beam. Thus, laser welding includes emitting the laser beam from the laser welding machine into the first slot and the second slot such that the laser beam welds the plurality of battery foils to the battery tab. The second clamping arm has a first arm end and a second arm end opposite the first arm end. The clamping system may have a first lip directly coupled to the first arm end of the second clamping arm. The clamping system may have a second lip directly coupled to the second arm end of the second clamping arm. The second clamping arm may be in direct contact with a plurality of battery layers and at least one of the battery foils. Each of the plurality of battery layers may be directly coupled to the battery foils. The first lip may be in direct contact with the battery tab. The second lip may be in direct contact with the battery foil. The first clamping arm may be in direct contact with the battery tab. The encoder assembly is configured to move the first clamping arm relative to the second clamping arm along a first axis to align the first slot with the second slot along a second axis, which may be perpendicular to the first axis.

The clamping system may further include at least one alignment block in direct contact with the first clamping arm and the second clamping arm in order to align the first slot with the second slot. The clamping system may further include at least one alignment pin coupled to the first clamping arm and the second clamping arm in order to align the first slot with the second slot. The first slot and the second slot are aligned with each other to define a weld path, and the shape of the weld path may be a linear shape, curved shape, zig-zag, or segmented shape. The weld path may be defined by offset linear trails, multiple curves or a plurality of dots.

The present disclosure also describes a clamping system for laser welding a plurality of battery foils to a battery tab. The clamping system includes a first clamping arm and a second clamping arm. The first clamping arm is movable relative to the second clamping arm to clamp the plurality of battery foils and the battery tab together. The first clamping arm defines a first slot. The second clamping arm defines a second slot. The first slot and the second slot are aligned with each other to allow a laser beam to be received by the first slot and the second slot to join the plurality of battery foils to the battery tab during laser welding. Each of the first slot and the second slot has a thickness that may be between one millimeter and three millimeters.

The present disclosure also describes a battery tab-to-foil weld between a plurality of battery foils to a battery tab that is prepared by a method, which includes clamping the plurality of battery foils and the battery tab together and laser welding the plurality of battery foils to the battery tab. Each of the plurality of battery foils has a thickness that may be between 0.004 millimeters and 0.03 millimeters, and the battery tab has a thickness that may be between 0.1 millimeters and 0.5 millimeters. The method does not include ultrasonic welding.

The above features and advantages and other features and advantages of the present disclosure are readily apparent from the following detailed description of the best modes for carrying out the disclosure when taken in connection with the accompanying drawings.

DETAILED DESCRIPTION

Figure 1:
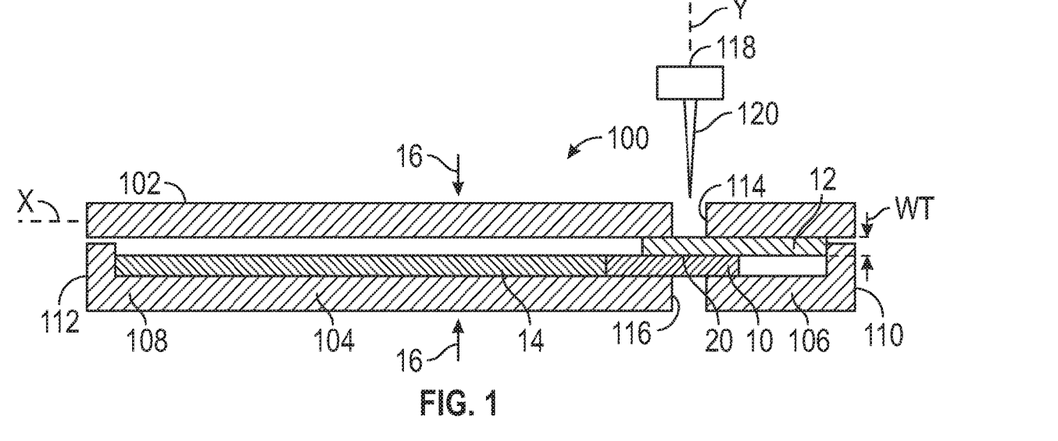
FIG. 1 is a schematic cross-sectional view of a clamping system for laser welding battery foils to a battery tab, wherein the battery tab is on top of the battery foils.

With reference to FIG. 1, during battery cell manufacturing, the battery foils 10 (which are directly attached to battery layers 14 of a battery cell) are joined to a battery tab 12. In a battery, the battery tabs 12 function as positive or negative electrodes. To serve as a negative electrode, the battery tab 12 may be, for example, wholly or partly made of copper or nickel or nickel coated copper. To serve as a positive electrode, the battery tab 12 may be, for example, wholly or partly made of aluminum. For proper placement and operability of the battery tabs 12 in a battery cell, the thickness WT of each battery tab 12 is between 0.1 millimeters and 0.5 millimeters. For optimal placement and operability of the positive electrode tab 12 in a battery cell, the thickness WT of each battery tab 12 is 0.2 millimeters. Further, in a battery cell, the battery foils 10 serve as either an anode current collector or a cathode current collector. To this end, the battery foils 10 may be made of copper to serve as an anode current collector, and another group of battery foils 10 may be made of aluminum to serve as a cathode current collector. During battery cell manufacturing, it useful to join the battery tab 12 to the battery foils 10 to allow the energy of the battery cell to be transferred to an external source. To do so, the present disclosure describes a clamping system 100 and a method 200 (FIG. 16) for laser welding the battery foils 10 to the battery tab 12.

Figure 2:
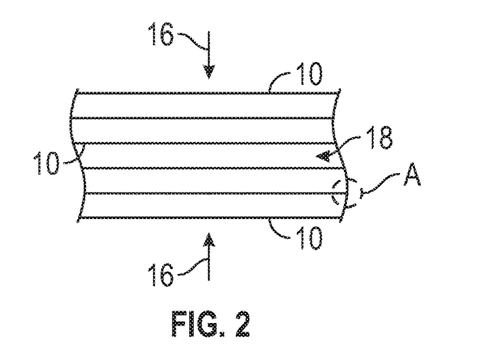
FIG. 2 is a schematic, enlarged side view of the battery foils while being clamped.

With reference to FIGS. 1 and 2, the battery foils 10 are stacked together and a clamping force 16 can be used to eliminate (or at least minimize the size of) the gaps 18 between the battery foils 10. It is desirable to eliminate (or at least minimize the size of) the gaps 18 between the battery foils 12 in order to create a structurally strong and efficient battery tab-to-foil weld 20. To do so, the present disclosure describes a clamping system 100 used for exerting a clamping force 16 on the battery foils 10 to eliminate (or at least minimize the size of) the gaps 18 between the battery foils 10. While ultrasonic welding may be used to join battery tabs 12 to battery foils 10, ultrasonic welding suffers from some shortcomings, for example: weld quality inconsistency (e.g., non-uniform weld thickness and penetration), resonance, mechanical and thermal deformation (e.g., cracks), and adhesion to the tool. To avoid these shortcomings, it is desirable to create a tab-to-foil weld 20 without using ultrasonic welding. By clamping the battery foils 10 and the battery tab 12 together, a structurally strong and efficient tab-to-foil weld 20 can be created using laser welding, but without using ultrasonic welding.

Figure 3:
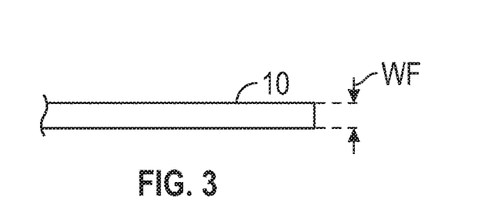
FIG. 3 is a schematic, enlarged, fragmentary side view of one battery foil, taken around area A of FIG. 2.

With reference to FIG. 3, for proper placement and operability of the battery foils 10 in a battery cell, the thickness WF of each battery foil 10 is between 0.05 millimeters and 0.03 millimeters (see FIG. 3). For optimal placement and operability of the battery foils 10 in a battery cell, the thickness WF of each battery foil 10 for the cathode current collector is in a range of 0.015 to 0.025 millimeters, such as 0.02 millimeters, and the thickness WF for each anode current collector is in the range of 0.005 to 0.015 millimeters, such as 0.01 millimeters.

Figure 4:
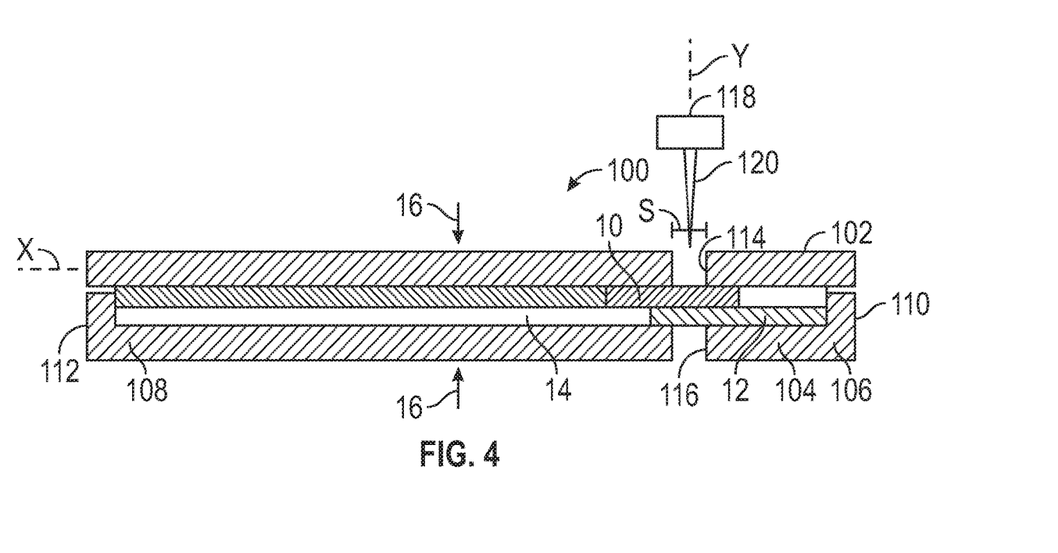
FIG. 4 is a schematic cross-sectional view of the clamping system shown in FIG. 1 with the battery tab on top of the battery foils.

With reference again to FIG. 1, the clamping system 100 includes a first clamping arm 102 and a second clamping arm 104 arranged parallel to each other to facilitate applying a clamping force 16 to the battery foils 10 and the battery tab 12. The second clamping arm 104 has a first arm end 106 and a second arm end 108 opposite to the first arm end 106. The clamping system 100 further includes a first lip 110 and a second lip 112. The first lip 110 is directly coupled to the first arm end 106 of the second clamping arm 104 and is in direct contact with the battery tab 12 to help align the battery tab 12 with respect to the battery foils 10. The second lip 112 is directly coupled to the second arm end 108 of the second clamping arm 104 and is in direct contact with all of the battery layers 14. The first clamping arm 102 is in direct contact with the battery tab 12, whereas the second clamping arm 104 is in direct contact with the battery layers 14 and at least on one of the battery foils 10 (i.e., the bottommost battery foil 10) to facilitate clamping the battery foils 10 and the battery tab 12 together. The first clamping arm 102 is elongated along a first or horizontal axis X. The first clamping arm 102 has a first slot 114, and the second clamping arm 104 has a second slot 116. The first slot 114 and the second slot 116 are aligned with each other along a second or vertical axis Y to prevent welding the battery foils 10 and/or the battery tab 12 to a fixture, such as the first clamping arm 102 and/or the second clamping arm 104. The second axis Y is perpendicular to the first axis X. The first slot 114 and the second slot 116 each has a thickness S that is between one millimeter and three millimeters to prevent welding the battery foils 10 and/or the battery tab 12 to a fixture. Optimally, the first slot 114 and the second slot 116 each has a thickness S that is two millimeters to prevent welding the battery foils 10 and/or the battery tab 12 to a fixture. After clamping the battery tab 12 and the battery foils 10 together, a laser welding machine 118 can be used to emit a laser beam 120 into the first slot 114 and the second slot 116 in order to weld the battery foils 10 to the battery tabs 12. As shown in FIG. 1, the battery tab 12 may be placed on top of the battery foils 10. Alternatively, as shown in FIG. 4, the battery foils 10 may be placed on top of the battery tab 12.

Figure 5:
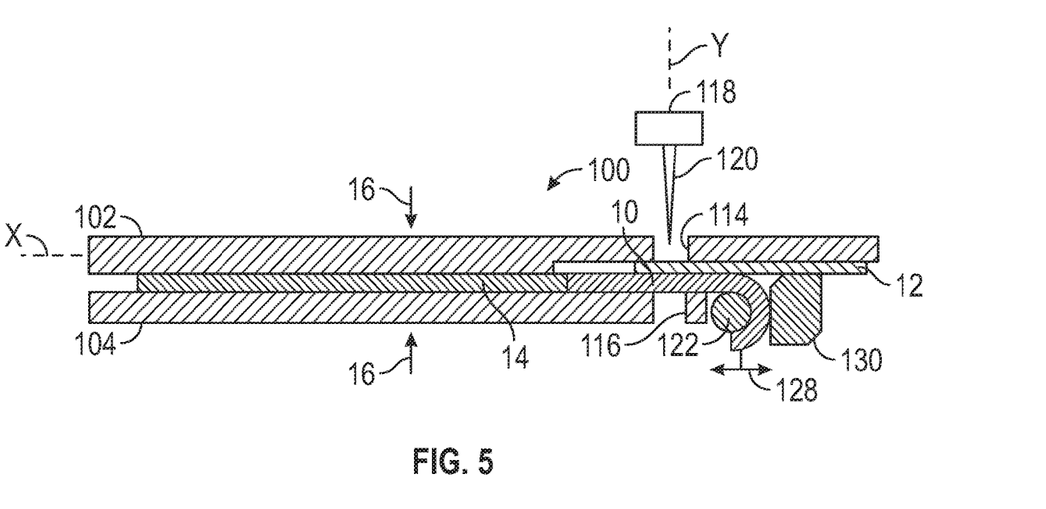
FIG. 5 is a schematic cross-sectional view of a clamping system for laser welding battery foils to a battery tab, wherein the clamping system includes a roller to place the battery foils in tension.
Figure 6:
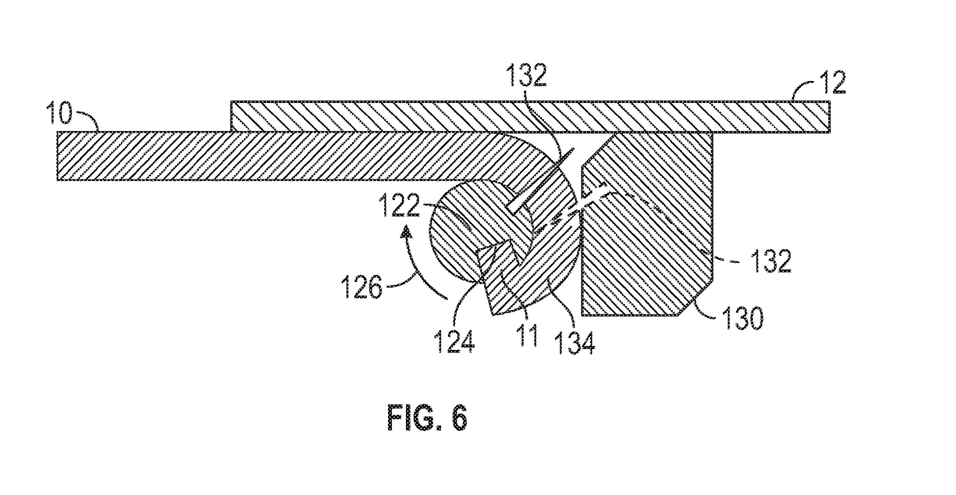
FIG. 6 is a schematic, fragmentary cross-sectional view of the clamping system shown in FIG. 5, depicting the roller and a cutter.

With reference to FIGS. 5 and 6, an embodiment of the clamping system 100 is substantially identical to the embodiment described above. Therefore, in the interest of brevity, the following disclosure highlights the differences between these embodiments. In this embodiment, the clamping system 100 includes a roller 122 configured to place the battery foils 10 in tension. To do so, the battery foils 10 are coupled to the roller 122. Specifically, the roller 122 defines a groove 124 configured, shaped, and sized to securely receive a securing portion 11 of the battery foils 10. As such, rotating the roller 122 in the direction indicated by arrow 126 causes the battery foils 10 to be placed in tension. Therefore, the groove 124 allows the battery foils 10 to be coupled to the roller 122. A certain degree of clamping force 16 may be applied to the battery foils 10 before rotating the roller 122 to facilitate placing the battery foils 10 in tension. The clamping system 100 may further include a stopper block 130 to secure the battery foils 10 in tension after the roller 122 has been rotated. The stopper block 130 may be configured to move along the longitudinal axis X in the direction indicated by double arrows 128. In operation, the stopper block 130 can move toward the battery foils 10 after the battery foils 10 have been placed in tension (by rotating the roller 122). Specifically, the stopper block 130 should be moved until the stopper block 130 is in direct contact (and applies pressure) to the battery foils 10. Alternatively or additionally, the roller 122 can move along the longitudinal axis X in the direction indicated by double arrow 128. In operation, the roller 122 can move toward the stopper block 130 after the battery foils 10 have been placed in tension (by rotating the roller 122). Specifically, the roller 122 should be moved until stopper block 130 is in direct contact (and applies pressure) to the battery foils 10.

With continuing reference to FIGS. 5 and 6, the clamping system further includes a cutter 132 directly coupled to the roller 122, the stopper block 130, or both. The cutter 132 may be configured as a blade and can cut a disposable portion 134 of the battery foils 10 that is disposed around the roller 122 after laser welding. The cutter 132 may be retractably coupled to the roller 122. In other words, the cutter 132 is retractable relative to the roller 122. Alternatively or additionally, the cutter 132 is retractable relative to the stopper block 130.

Figure 7:
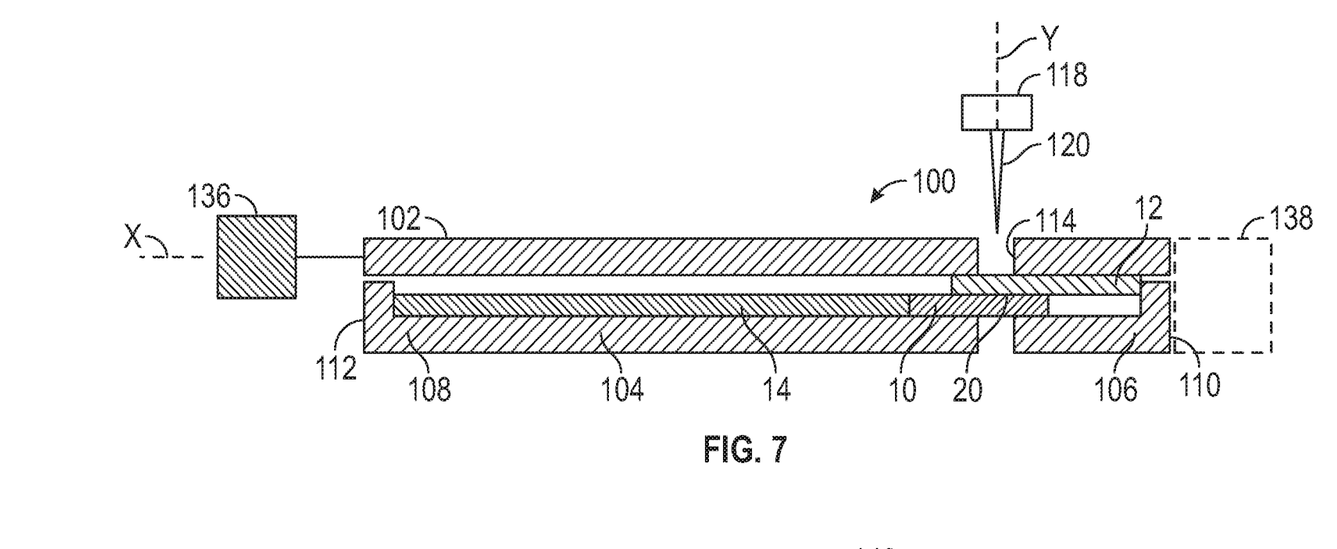
FIG. 7 is a schematic cross-sectional view of a clamping system for laser welding battery foils to a battery tab, wherein the clamping system includes an encoder assembly.

With reference to FIG. 7, an embodiment of the clamping system 100 is substantially identical to the embodiment described above. Therefore, in the interest of brevity, the following disclosure highlights the differences between these embodiments. In this embodiment, the clamping system 100 includes an encoder assembly 136 configured to detect the position of the first clamping arm 102 relative to the second clamping arm 104. Alternatively or additionally, the encoder assembly 136 can be configured to detect the position of the second clamping arm 104 relative to the first clamping arm 102. In addition, the encoder assembly 136 can move the first clamping arm 102 relative to the second clamping arm 104 in response to the detected position of the first clamping arm 102 relative to the second clamping arm 104 in order to align the first slot 114 with the second slot 116 along the second axis Y. For example, the encoder assembly 136 can be configured to move the first clamping arm 102 relative to the second clamping arm 104 along the first axis X (and another axis into and out of the page) to align the first slot 114 with the second slot 116 along the second axis Y. As discussed above, the second axis Y is perpendicular to the first axis X. Alternatively or additionally, the encoder assembly 136 can move the second clamping arm 104 relative to the first clamping arm 102 in response to the detected position of the first clamping arm 102 relative to the second clamping arm 104 in order to align the first slot 114 with the second slot 116 along the second axis Y. In addition, the clamping system 100 may include at least one alignment block 138 to help align the first slot 114 with the second slot 116. To do so, the alignment block 138 may be, for example, placed in direct contact with the first clamping arm 102 and the second clamping arm 104.

Figure 8:
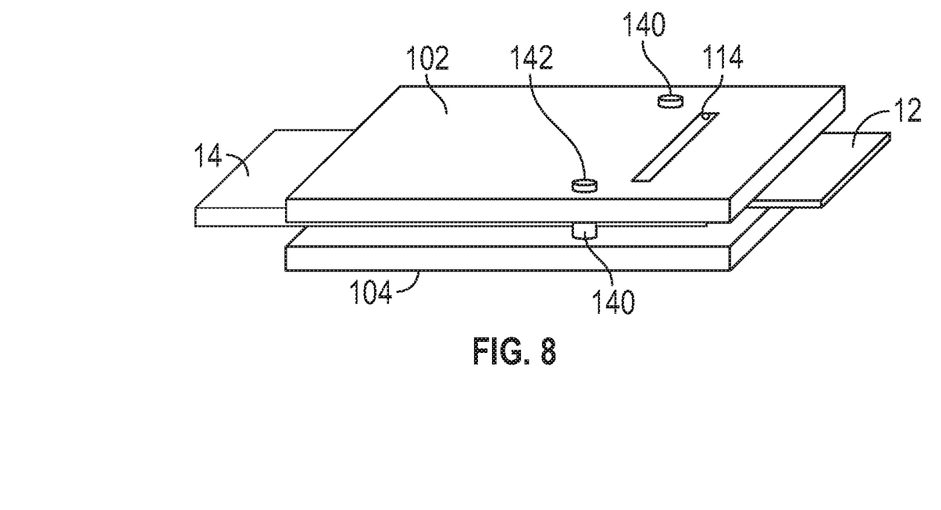
FIG. 8 is a schematic perspective view a clamping system for laser welding battery foils to a battery tab, wherein the clamping system includes alignment pins.

With reference to FIG. 8, an embodiment of the clamping system 100 is substantially identical to the embodiment described above. Therefore, in the interest of brevity, the following disclosure highlights the differences between these embodiments. In this embodiment, the clamping system 100 includes one or more alignment pins 140 extending through the first clamping arm 102 and the second clamping arm 104 to align the first slot 114 with the second slot 116. Each of the first clamping arm 102 and the second clamping arm 104 has alignment holes 142 configured, shaped, and sized to receive the alignment pins 140, thereby allowing each alignment pin 140 to extend through the first clamping arm 102 and the second clamping arm 104.

Figure 9:
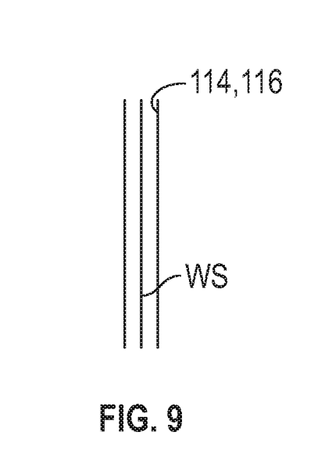
FIG. 9 is a schematic diagram showing a linear weld path defined by the first slot and the second slot of the clamping system.
Figure 10:
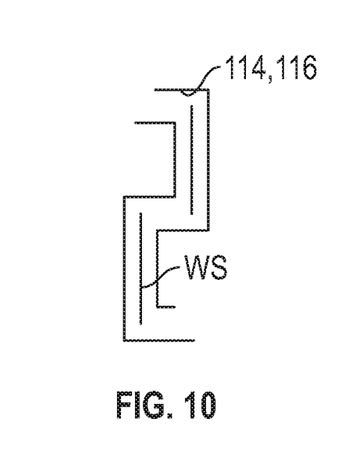
FIG. 10 is a schematic diagram showing a weld path in the shape of offset linear trails defined by the first slot and the second slot of the clamping system.
Figure 11:
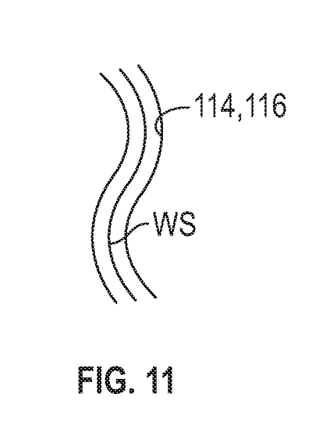
FIG. 11 is a schematic diagram showing a curved weld path defined by the first slot and the second slot of the clamping system.
Figure 12:
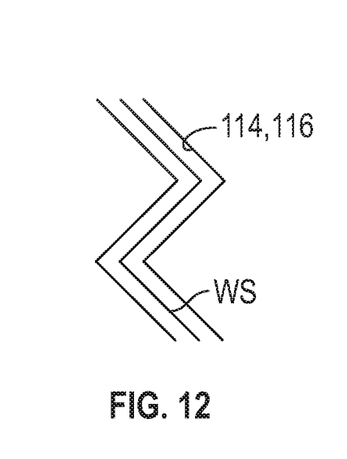
FIG. 12 is a schematic diagram showing a zig-zag weld path defined by the first slot and the second slot of the clamping system.
Figure 13:
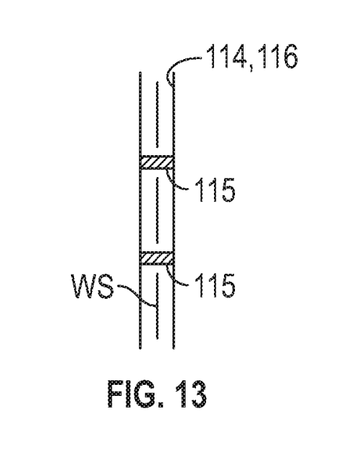
FIG. 13 is a schematic diagram showing a segmented weld path defined by the first slot and the second slot of the clamping system.
Figure 14:
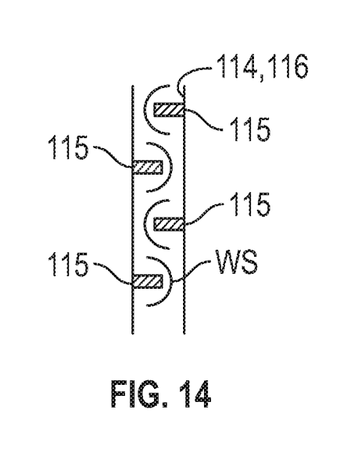
FIG. 14 is a schematic diagram showing a weld path in the shape of multiple curves defined by the first slot and the second slot of the clamping system.
Figure 15:
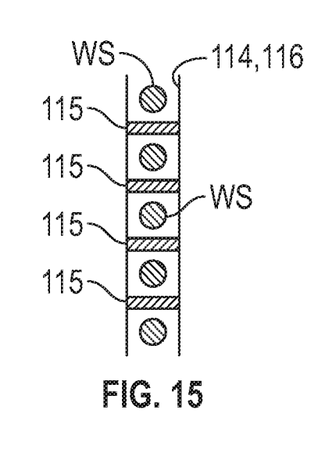
FIG. 15 is a schematic diagram showing a weld path in the shape of multiple dots defined by the first slot and the second slot of the clamping system.

With reference to FIGS. 9-15, the first slot 114 and/or the second slot 116 can define weld paths having different shapes. For instance, as shown in FIG. 9, the first slot 114 and/or the second slot 116 can define a linear weld path in order to produce a linear welding seam WS. As shown in FIG. 10, the first slot 114 and/or the second slot 116 can define a weld path in the shape of offset linear trails in order to produce welding seam WS having the same shape. As shown in FIG. 11, the first slot 114 and/or the second slot 116 can define a weld path having a curved shape (e.g., a sinusoidal shape) in order to produce welding seam WS having the same shape. As shown in FIG. 12, the first slot 114 and/or the second slot 116 can define a zig-zag weld path in order to produce welding seam WS having the same shape. As shown in FIG. 13, the first slot 114 and/or the second slot 116 can define a segmented weld path in order to produce welding seam WS defined by segmented lines. To do so, the clamping system 100 may include partition walls 115. As shown in FIG. 14, the first slot 114 and/or the second slot 116 can define a weld path in the shape of multiple curves in order to produce welding seam WS having the same shape. To do so, the clamping system 100 may include partition walls 115. As shown in FIG. 15, the first slot 114 and/or the second slot 116 can define a weld path in the shape of multiple dots in order to produce welding seam WS having the same shape lines. To do so, the clamping system 100 may include partition walls 115.

Figure 16:
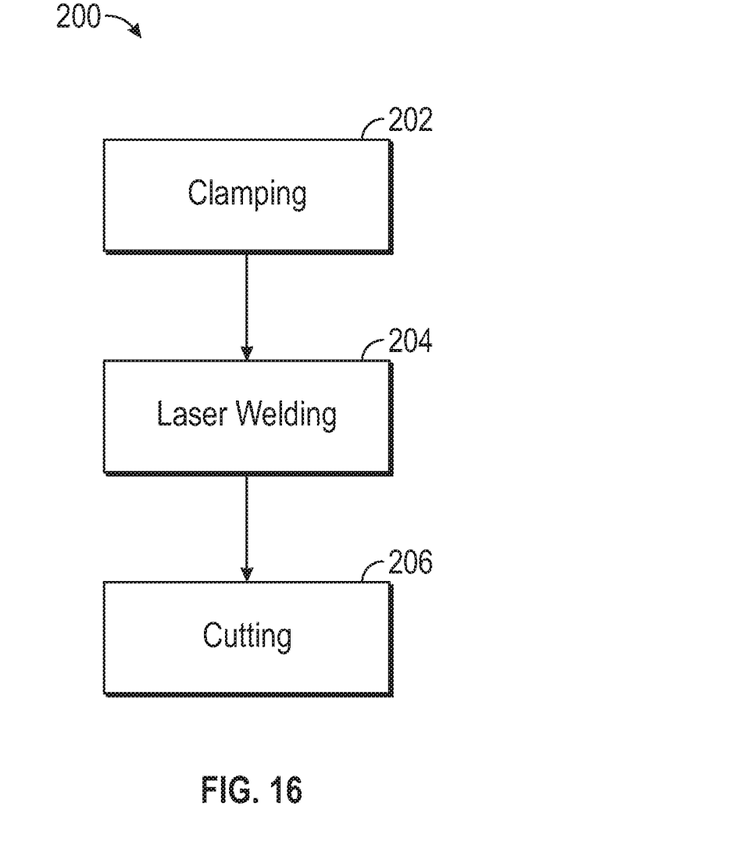
FIG. 16 is a flowchart of a method for laser welding battery foils to a battery tab.

With reference to FIG. 16, the clamping system 100 can be used to laser weld the battery foils 10 to the battery tab 12 using the method 200. The method 200 begins at step 202, which entails clamping the battery foils 10 and the battery tab 12 together. To do so, the first clamping arm 102 and the second clamping arm 104 can apply a clamping force 16 to the battery foils 10 and the battery tab 12 to eliminate (or at least minimize the size of) the gaps 18 between the battery foils 10. As a consequence, ultrasonic welding is not needed to join the battery foils 10 to the battery tab 12. Thus, the method 200 does not include ultrasonic welding. To clamp the battery foils 10 and the battery tab 12 together, the first clamping arm 102 and/or second clamping arm 104 are moved toward each other while the battery foils 10 and the battery tab 12 are disposed between the first clamping arm 102 and the second clamping arm 104. Step 202 may also entail placing the battery foils 10 in tension using the roller 122 (as discussed above) before clamping the battery foil 10 and the battery tab 12 together. To do so, the securing portion 11 of the battery foils 10 may be securely disposed in the groove 124 of the roller 122. Then, the roller 122 is rotated in the direction indicated by arrow 126 to place the battery foils 10 in tension. Step 202 may also entail aligning the first slot 114 and the second slot 116 as discussed above. For example, the encoder assembly 136 can detect the position of the first clamping arm 102 relative to the second clamping arm 104. In response to detecting a misalignment between the first slot 114 and the second slot 116, the encoder assembly 136 moves the first clamping arm 102 relative to the second clamping arm 104 to align the first slot 114 with the second slot 116. Then, the method 200 proceeds to step 204.

At step 204, the battery foils 10 are laser welded to the battery tab 12 using the laser welding machine 118. As discussed above, the laser welding machine 118 emits a laser beam 120 into the first slot 114 and the second slot 116 to weld the battery foils 10 to the battery tab 12. Then, the method 200 proceeds to step 206.

Step 206 entails cutting the battery foils 10 to remove the disposable portion 134 of the battery foils 10 that is disposed around the roller 122 after the laser welding at step 204. To do so, as described above, the cutter 132 (e.g., blade) may be moved from a retracted position to a deployed position from the roller 122 and/or the stopper block 130. By employing the method 200, a battery tab-to-foil weld 20 (FIG. 1) can be prepared that is smoother than a battery tab-to-foil weld created using ultrasonic welding. As a consequence, it is less likely that the battery tab-to-foil weld 20 would pierce the battery pouch in comparison with battery tab-to-foil weld created using ultrasonic welding.

While the best modes for carrying out the disclosure have been described in detail, those familiar with the art to which this disclosure relates will recognize various alternative designs and embodiments for practicing the disclosure within the scope of the appended claims. The embodiments described in this disclosure can be combined with each other to create embodiments not explicitly disclosed herein.

What is claimed is:

1. A method for laser welding a plurality of battery foils to a battery tab, comprising:
   clamping the plurality of battery foils and the battery tab together, wherein each of the plurality of battery foils has a thickness that is between 0.004 millimeters and 0.03 millimeters, and the battery tab has a thickness that is between 0.1 millimeters and 0.5 millimeters;
   laser beam welding the plurality of battery foils to the battery tab; and
   wherein the method is characterized by an absence of ultrasonic welding;
   wherein clamping the plurality of battery foils and the battery tab together includes:
   moving a first clamping arm and a second clamping arm toward each other while the plurality of battery foils and the battery tab are disposed between the first clamping arm and the second clamping arm; and
   wherein the first clamping arm defines a first slot, the second clamping arm defines a second slot, the first slot and the second slot are aligned with each other to allow a laser beam to be received by the first slot and the second slot to join the plurality of battery foils to the battery tab during the laser welding; and
   wherein the first clamping arm and the second clamping arm are part of a clamping system, the clamping system further includes at least one alignment block in direct contact with the first clamping arm and the second clamping arm in order to align the first slot with the second slot, and the method further includes placing the at least one alignment block in direct contact with the first clamping arm and the second clamping arm in order to align the first slot with the second slot.

2. The method of claim 1, wherein each of the first slot and the second slot has a thickness that is between one millimeter and three millimeters, each battery foil of the plurality of battery foils is one of a cathode current collector aluminum having a thickness in a range of 0.015 to 0.025 millimeter and an anode current collector copper having a thickness in a range of 0.005 to 0.015 millimeter, and the battery tab is one of a positive electrode having a thickness in a range of 0.25 to 0.35 millimeter and a negative electrode having a thickness in a range of 0.15 to 0.25 millimeter, and clamping the plurality of battery foils and the battery tab together includes clamping the cathode current collector aluminum having the thickness in the range of 0.015 to 0.025 millimeter and the positive electrode having the thickness in the range of 0.25 to 0.35 millimeter together.

3. The method of claim 2, wherein the first clamping arm and the second clamping arm are part of a clamping system, the clamping system further includes at least one lip coupled to the second clamping arm to align the battery tab with the plurality of battery foils to facilitate the laser welding, and wherein clamping the plurality of battery foils and the battery tab together includes moving the first clamping arm relative to the at least one lip.

4. The method of claim 3, wherein the battery foils are placed in tension with a roller, the battery foils are coupled to the roller, the roller is rotated to place the plurality of battery foils in tension, and the roller defines a groove sized to securely receive a securing portion of the plurality of battery foils in order to couple the plurality of battery foils to the roller.

5. The method of claim 4, further comprising cutting the plurality of battery foils to remove a disposable portion of the plurality of battery foils that is disposed around the roller after the laser welding.

6. The method of claim 5, wherein the disposable portion of the plurality of battery foils is cut with a cutter directly coupled to the roller, wherein the cutter is retractable relative to the roller.

7. The method of claim 6, further comprising securing the plurality of battery foils with a stopper block after placing the plurality of battery foils in tension to maintain the plurality of battery foils in tension after the clamping.

8. The method of claim 7, wherein the disposable portion of the plurality of battery foils is cut with a cutter directly coupled to the stopper block.

9. The method of claim 1, wherein the first clamping arm and the second clamping arm are part of a clamping system, the clamping system further comprises an encoder assembly configured to detect a position of the first clamping arm relative to the second clamping arm, the encoder assembly is configured to move the first clamping arm relative to the second clamping arm in response to the detected position of the first clamping arm relative to the second clamping arm in order to align the first slot with the second slot, each of the first slot and the second slot has a thickness that is two millimeters, the thickness of each of the plurality of battery foils is 0.02 millimeters, and the thickness of the battery tab is 0.5 millimeters, the laser welding is conducted using a laser welding machine, the laser welding machine is configured to emit a laser beam, the laser welding includes emitting the laser beam from the laser welding machine into the first slot and the second slot such that the laser beam welds the plurality of battery foils to the battery tab, the second clamping arm has a first arm end and a second arm end opposite the first arm end, the clamping system has a first lip directly coupled to the first arm end of the second clamping arm, the clamping system has a second lip directly coupled to the second arm end of the second clamping arm, the second clamping arm is in direct contact with a plurality of battery layers and at least one of the battery foils, each of the plurality of battery layers is directly coupled to the battery foils, the first lip is in direct contact with the battery tab, the second lip is in direct contact with all of the plurality of battery layers, the first clamping arm is in direct contact with the battery tab, the encoder assembly is configured to move the first clamping arm relative to the second clamping arm along a first axis to align the first slot with the second slot along a second axis, and the second axis is perpendicular to the first axis, the method further comprises detecting, using the encoder assembly, the position of the first clamping arm relative to the second clamping arm, the method further comprises moving, using the encoder assembly, the first clamping arm relative to the second clamping arm in response to the detecting the position of the first clamping arm relative to the second clamping arm in order to align the first slot with the second slot, and moving, using the encoder assembly, the first clamping arm relative to the second clamping arm includes moving the first clamping arm relative to the second clamping arm along the first axis to align the first slot with the second slot along the second axis.

10. The method of claim 9, wherein laser beam welding the plurality of battery foils to the battery tab includes emitting the laser beam into the first slot and the second slot each having the thickness that is two millimeters.

11. The method of claim 1, wherein the first clamping arm and the second clamping arm are part of a clamping system, and the clamping system further includes at least one alignment pin coupled to the first clamping arm and the second clamping arm in order to align the first slot with the second slot.

12. The method of claim 1, wherein the first slot and the second slot are aligned with each other to define a weld path, and the weld path has a shape selected from a group consisting of a linear shape, curved shape, zig-zag, and segmented shape.

13. The method of claim 1, wherein the first slot and the second slot are aligned with each other to define a weld path, and the weld path is defined by offset linear trails.

14. The method of claim 1, wherein the first slot and the second slot are aligned with each other to define a weld path, and the weld path is defined by multiple curves.

15. The method of claim 1, wherein the first slot and the second slot are aligned with each other to define a weld path, and the weld path is defined by a plurality of dots.

16. A battery tab-to-foil weld between a plurality of battery foils to a battery tab prepared by a method comprising:
    clamping the plurality of battery foils and the battery tab together, wherein each of the plurality of battery foils has a thickness that is between 0.004 millimeters and 0.03 millimeters, and the battery tab has a thickness that is between 0.1 millimeters and 0.5 millimeters;
    forming the weld by laser beam welding the plurality of battery foils to the battery tab; and
    wherein the method does not include ultrasonic welding;
    wherein clamping the plurality of battery foils and the battery tab together includes:
    moving a first clamping arm and a second clamping arm toward each other while the plurality of battery foils and the battery tab are disposed between the first clamping arm and the second clamping arm; and
    wherein the first clamping arm defines a first slot, the second clamping arm defines a second slot, the first slot and the second slot are aligned with each other to allow a laser beam to be received by the first slot and the second slot to join the plurality of battery foils to the battery tab during the laser welding; and
    wherein the first clamping arm and the second clamping arm are part of a clamping system, the clamping system further includes at least one alignment block in direct contact with the first clamping arm and the second clamping arm in order to align the first slot with the second slot, and the method further includes placing the at least one alignment block in direct contact with the first clamping arm and the second clamping arm in order to align the first slot with the second slot.

* * * * *